United States Patent [19]
Patel et al.

[11] Patent Number: 5,580,116
[45] Date of Patent: Dec. 3, 1996

[54] TRIM COMPONENT HAVING ENERGY ABSORBING FEATURE

[75] Inventors: Rasik N. Patel, Canton; Praful J. Patel, Novi; Syed A. Shahab, Bloomfield Hills, all of Mich.

[73] Assignee: Ford Motor Company, Dearborn, Mich.

[21] Appl. No.: 417,365

[22] Filed: Apr. 5, 1995

[51] Int. Cl.⁶ ............................................. B62D 25/00
[52] U.S. Cl. ........................... 296/39.1; 280/751; 296/189
[58] Field of Search ................... 296/39.1, 189, 296/205; 280/751, 748, 752; 180/90

[56] References Cited

U.S. PATENT DOCUMENTS

| | | | |
|---|---|---|---|
| 3,817,553 | 6/1974 | Wilfert | 280/150 B |
| 3,831,705 | 8/1974 | Glance | 180/90 |
| 3,861,486 | 1/1975 | Wilfert | 180/90 |
| 3,966,227 | 6/1976 | Cameron | 280/752 |
| 4,123,085 | 10/1978 | Oda et al. | 280/752 |
| 4,168,095 | 9/1979 | Temino et al. | 296/70 |
| 4,400,011 | 8/1983 | Matsuno | 280/748 |
| 5,163,730 | 11/1992 | Welch | 296/189 |
| 5,445,430 | 8/1995 | Nichols | 280/751 X |

FOREIGN PATENT DOCUMENTS

| | | | |
|---|---|---|---|
| 1780300 | 5/1978 | Germany | 280/751 |
| 657310 | 9/1963 | Italy . | |
| 2238989 | 6/1991 | United Kingdom | 280/751 |

*Primary Examiner*—David M. Mitchell
*Assistant Examiner*—Kia M. Robinson
*Attorney, Agent, or Firm*—Daniel M. Stock, Esq.; Roger L. May, Esq.

[57] ABSTRACT

A trim component for mounting to a structural member of an automotive vehicle presenting an edge including a body adapted to be fixedly mounted to the structural member and extending substantially along the length thereof. The body presents a primary surface facing the interior of the vehicle and a contoured mounting surface disposed opposite the primary surface and corresponding to the shape of the structural member. The contoured mounting surface includes a plate disposed adjacent the edge presented by the structural member when the trim component is mounted thereto.

19 Claims, 2 Drawing Sheets

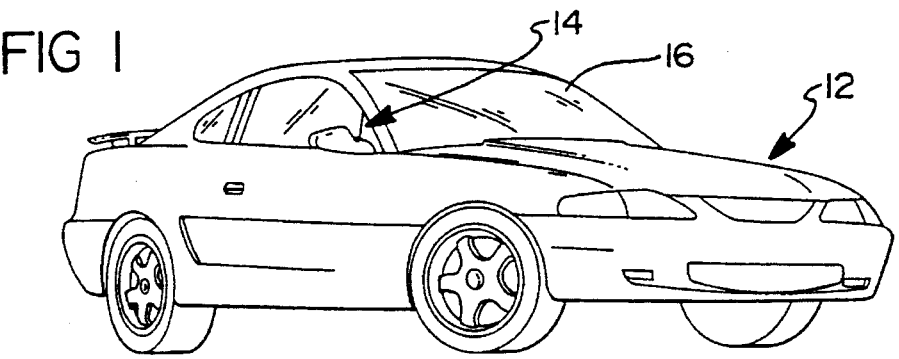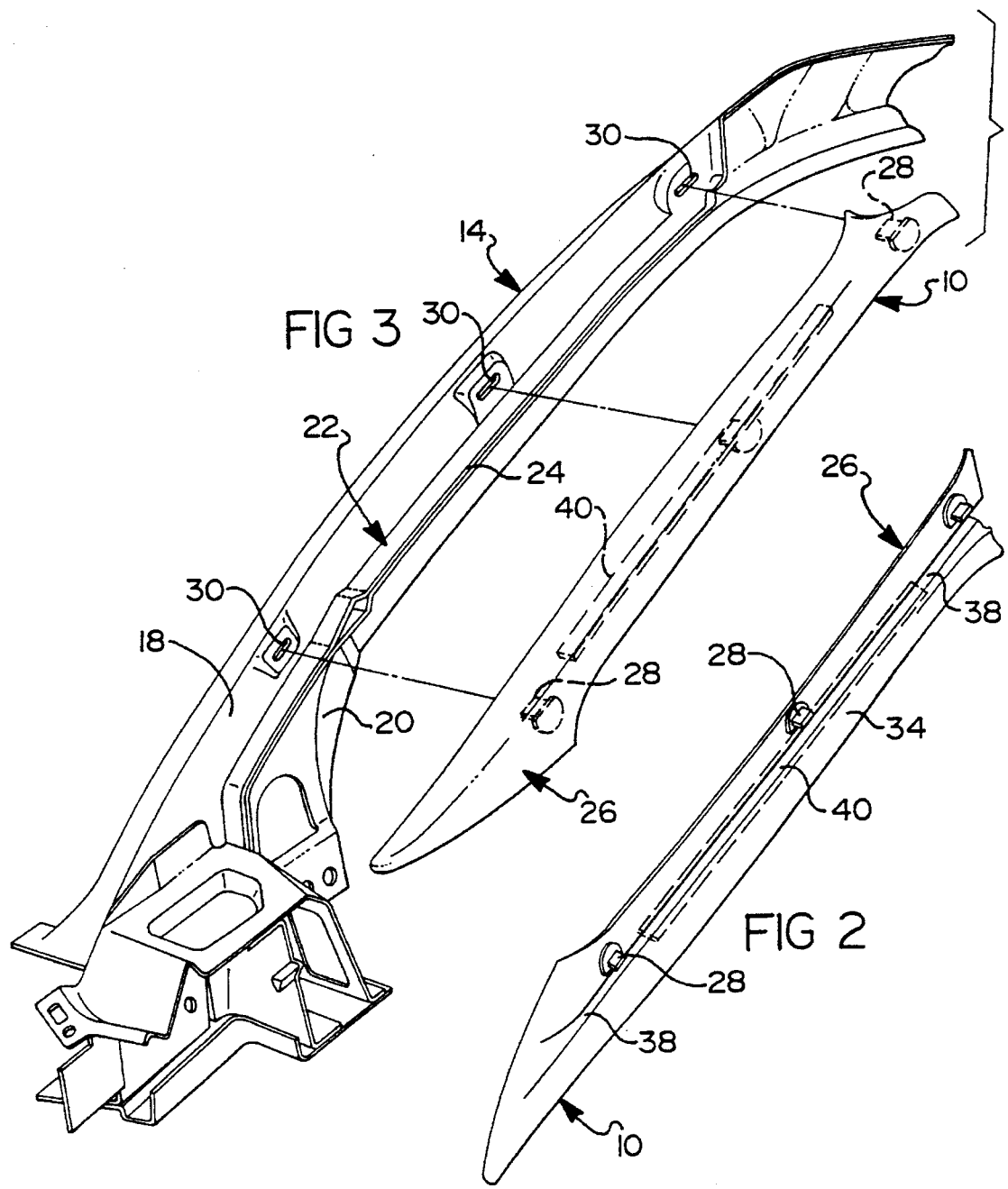

TRIM COMPONENT HAVING ENERGY ABSORBING FEATURE

BACKGROUND OF THE INVENTION

1. Field of the Invention

The present invention relates generally to trim components and, more specifically, to automotive trim components having energy absorbing features.

2. Description of the Related Art

Trim components are used in automotive applications to present an aesthetically pleasing appearance in the interior of the vehicle, to smooth contours and to cover structural load bearing components of the vehicle. For example, trim components are employed for these purposes in connection with the A, B, C, and D pillars of the vehicle, the side rails as well as the roof rails or the front and rear headers.

In addition to the asthetic purposes of such trim components, they also absorb energy in the event of an impact or collision. Thus, there is a need in the art for trim components having enhanced energy absorbing capabilities which also meet the design objectives identified above without sacrificing the interior space of the vehicle.

SUMMARY OF THE INVENTION

The present invention overcomes the disadvantages discussed above and effectively lowers the HIC values for trim components in automotive vehicles. More specifically, the present invention is directed toward a trim component for mounting to a structural member of an automotive vehicle presenting an edge including a body fixedly mounted to the structural member and extending substantially along the length thereof. The body presents a primary surface facing the interior of the vehicle and a contoured mounting surface disposed opposite the primary surface and corresponding to the shape of the structural member. The contoured mounting surface includes a plate disposed adjacent the edge presented by the structural member when the trim component is mounted thereto. The plate engages the edge and bends relative thereto in response to a force acting on the body to absorb and dissipate the energy generated by the force.

The present invention may be employed in connection with all interior trim components and especially in connection with upper trim components such as the A, B, C, and D pillars which present edges directed toward the interior of the vehicle such as when two or more sheet metal, structural components are joined together. The present invention reduces the HIC values on such trim components by effectively absorbing and dissipating energy generated due to the force of an impact without sacrificing the interior space of the vehicle.

Other features and advantages of the present invention will be readily appreciated as the same becomes better understood after reading the subsequent description when considered in connection with the accompanying drawings.

BRIEF DESCRIPTION OF THE DRAWINGS

FIG. 1 is a perspective of an automotive vehicle;

FIG. 2 is a perspective view of the trim component of the present invention illustrating the contoured mounting surface thereof;

FIG. 3 is an exploded view illustrating the trim component of the present invention mounted to a structural member of a vehicle;

DESCRIPTION OF THE PREFERRED EMBODIMENT(S)

Figure 4:
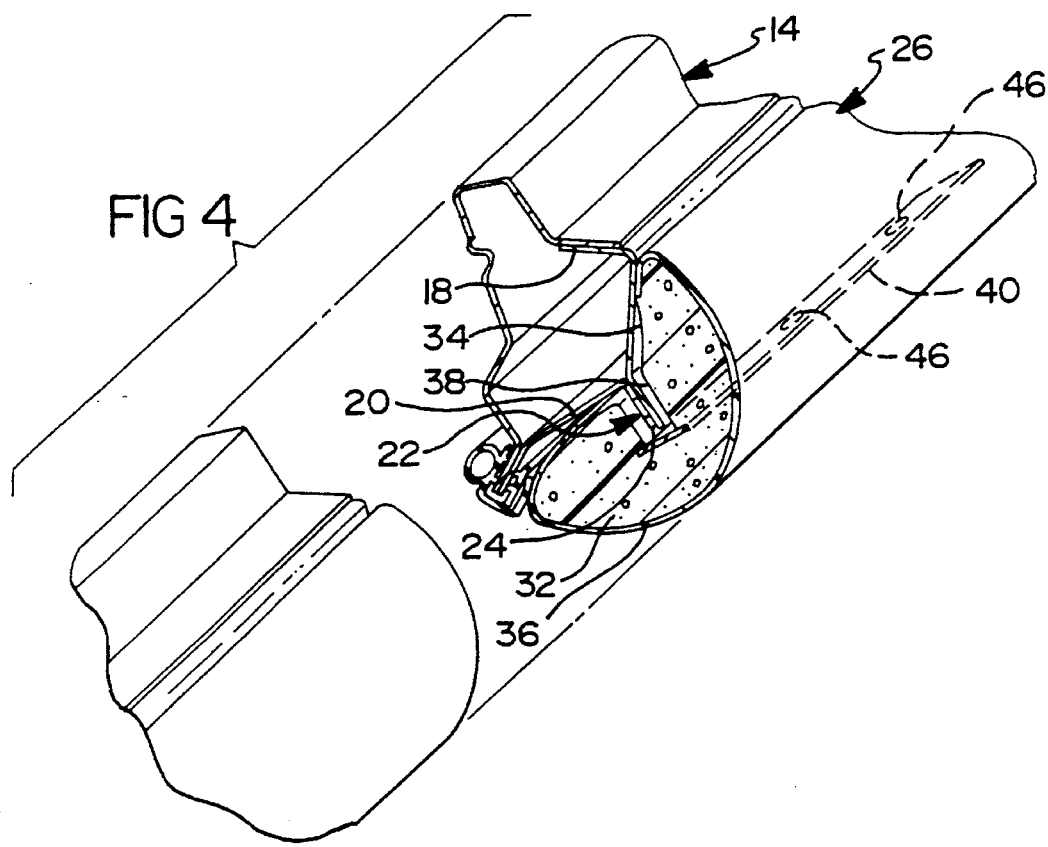
FIG. 4 is a perspective view with a portion broken away illustrating a cross-section of the trim component of the present invention mounted to a structural member.
Figure 5:
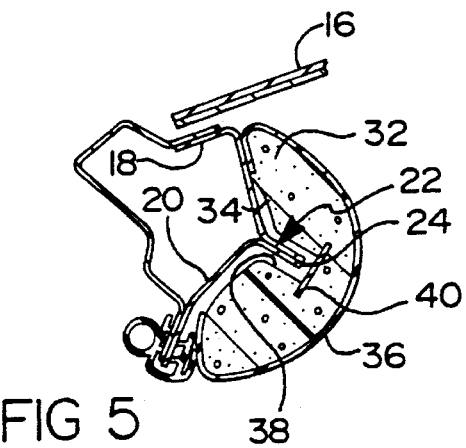
FIG. 5 is a cross-sectional side view of the trim component substantially as shown in FIG. 4 mounted to a structural member.

The present invention is directed toward an energy absorbent trim component, generally indicated at 10 in FIGS. 2 and 3. Trim components 10 are often employed in connection with structural components on automotive vehicles, one example of which is generally shown at 12 in FIG. 1. The structural components often associated with interior trim components may include A, B, C and D pillars as well as side and roof rails. It will be appreciated, however, that the trim component 10 of the present invention may be employed at many locations in a vehicle to present an aesthetically pleasing appearance in the interior of the vehicle, to smooth contours and to cover structural load bearing components of the vehicle.

In the examples shown in the figures, the trim component 10 of the present invention is mounted to an A-pillar 14. The A-pillar 14 is located at the forward end of the cab and roof line of a vehicle 12. A windshield 16 extends between a pair of A-pillars, one of which is shown in FIG. 1. As illustrated in FIGS. 3–7, the A-pillar 14 is a structural, load bearing member of the vehicle 12 fabricated from sheet metal components, for example as indicated at 18 and 20. The sheet metal components 18, 20 are welded or otherwise fixedly attached together at a joint, generally indicated at 22. The joint 22 defines an edge 24 or flange which may extend toward the interior of the vehicle 12 as shown in the figures. The joint 22 and thus the edge 24 may extend along a substantial portion of the A-pillar 14 or structural member in question.

Referring now to FIGS. 2 and 3, one embodiment of the trim component 10 of the present invention is shown and includes a body, generally indicated at 26, adapted to be fixedly mounted to the structural member 14 and extending along the entire length thereof. To that end, the body 26 and A-pillar 14 include a fastening mechanism, which in this case comprises a series of tabs 28 disposed along the length of the trim component 10. The tabs 28 are received in complementary sockets 30 found on the structural member 14 and corresponding to the tabs 28. It should be appreciated, however, that any fastening mechanisms suitable for the application required may be employed.

As best shown in FIG. 4, the body 26 includes a foam portion 32 molded to present a contoured mounting surface 34 corresponding to the shape of the structural member 14 and a skin 36 bonded to the foam portion 32 opposite the contoured mounting surface 34. The skin 36 presents a primary surface facing the interior of the vehicle 10. In the preferred embodiment, the foam portion 32 is a foamed, energy management polyurethane (recoverable, resilient, or friable). The skin 36 may be made of plastic, vinyl, cloth, leather or any other material suitable for a class A surface in the interior of an automotive vehicle. The skin 36 is bonded to the foam portion 32 using bonding agents and processes commonly known in the art.

The contoured mounting surface 34 abuts the structural member 14 and includes a groove 38 extending longitudinally along a substantial portion of the body 26 corresponding to and adapted to accommodate the joint 22 and edge 24 of the structural member 14. A plate 40 is disposed at the bottom of the groove 38 and spaced from, but adjacent to, the edge 24 presented by the structural member 14 when the trim component 10 is mounted thereto. More specifically, the plate 40 is flat and extends along the bottom of a substantial portion of the groove 38 and is spaced from the distal end of the edge 24 and substantially perpendicular to the direction that the joint 22 and thus the edge 24 extend in the groove.

Figure 7:
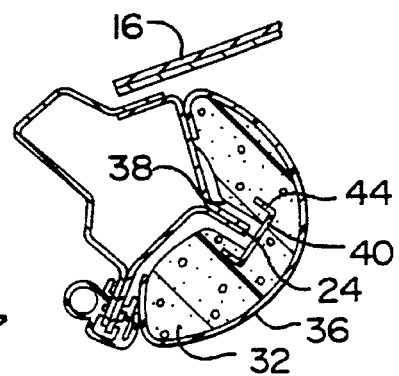
FIG. 7 is a cross-sectional side view of an alternative embodiment of the trim component substantially as shown in FIG. 4 mounted to a structural member.

Alternatively and as shown in FIG. 7, the plate 40 may include a pair of edges 44 disposed along the side of the plate 40 and extending along the length of the plate 40 in the groove 38.

The plate 40 is molded into the foam portion 32 at the bottom of the groove 38 and includes a plurality of apertures 46 disposed spaced relative to each other along the length of the plate 40 as shown in FIG. 4. The apertures 46 serve to promote the bond between the foam 32 and the plate and also aid to dissipate energy in the event of an impact as will be discussed in greater detail below. In the preferred embodiment, the plate 40 may be made of metal or plastic. However, it should be appreciated that the plate 40 may be made of any other material suitable for its purposes.

Figure 6:
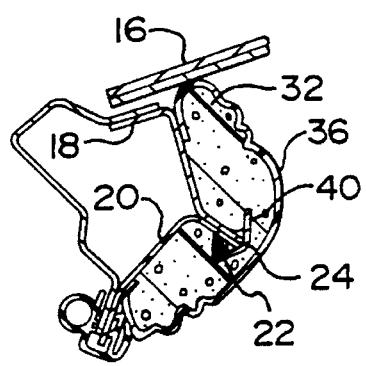
FIG. 6 is a cross-sectional side view substantially as shown in FIG. 4 illustrating the trim component of the present invention mounted to a structural member after receiving an impact force.

As illustrated in FIG. 6, in the event of a collision, energy is absorbed and dissipated by the energy management foam portion 32. Additionally, and when the force of the impact is great enough, the energy of the force will also be dissipated as the plate 40 engages the edge 24 of the joint 22. The plate 40 bends relative to the edge 24 aided by the apertures 46 located along the length of the plate 40. In this way, the trim component 10 responds to the forces acting on the body 26 of the trim component 10 mounted to a structural member 14 to absorb and dissipate the energy generated by the force and thus lowers the HIC values associated with such components. Further, these objectives and advantages are achieved in an aesthetically pleasing trim component 10 without sacrificing the interior compartment space of the vehicle.

The present invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims the present invention may be practiced otherwise than as specifically described.

What is claimed is:

1. A trim component for mounting to a structural member of an automotive vehicle presenting an edge, said trim component comprising;

a body fixedly mounted to the structural member and extending substantially along the length thereof, said body presenting a primary surface facing the interior of the vehicle and a contoured mounting surface disposed opposite the primary surface and corresponding to the shape of the structural member, said contoured mounting surface including a groove for accommodating the edge of the structural member and a plate disposed at the bottom of said groove and adjacent the edge presented by the structural member when the trim component is mounted thereto, said plate engaging the edge and bending relative thereto in response to a force acting on said body to absorb and dissipate the energy generated by the force.

2. A trim component as set forth in claim 1 wherein said groove extends longitudinally along a substantial portion of said body.

3. A trim component as set forth in claim 1 wherein said plate is flat and extends along the bottom of a substantial portion of said groove and spaced from the distal end of the edge presented by the structural member and substantially perpendicular thereto.

4. A trim component as set forth in claim 1 wherein said plate includes a plurality of apertures disposed spaced relative to each other along the length of said plate.

5. A trim component as set forth in claim 1 wherein said plate includes a pair of edges disposed along the side of said plate and extended along the length of said plate in said groove.

6. A trim component as set forth in claim 1 wherein said body includes a foam portion molded to present said contoured mounting surface and a skin bonded to said foam portion to present said primary surface.

7. A trim component as set forth in claim 5 wherein said plate is molded into said foam portion at said bottom of said groove.

8. A trim component as set forth in claim 1 wherein said plate is made of metal.

9. A trim component as set forth in claim 6 wherein said foam portion is made of polyurethane.

10. A trim component as set forth in claim 6 wherein said skin is made of plastic.

11. A trim component as set forth in claim 6 wherein said skin is made of vinyl.

12. A trim component as set forth in claim 6 wherein said skin is made of cloth.

13. A trim component as set forth in claim 6 wherein said skin is made of leather.

14. A trim component for mounting to a structural member of an automotive vehicle presenting an edge, said trim component comprising;

a body fixedly mounted to the structural member and extending substantially along the entire length thereof, said body including a foam portion molded to present a contoured mounting surface corresponding to the shape of the structural member and a skin bonded to said foam portion opposite said contoured mounting surface to present a primary surface facing the interior of the vehicle, said contoured mounting surface including a groove extending longitudinally along a substantial portion of said body for accommodating the edge of the structural member and a plate disposed at the bottom of said groove and adjacent the edge presented by the structural member when the trim component is mounted thereto, said plate engaging the edge and bending relative thereto in response to a force acting on said body to absorb and dissipate the energy generated by the force.

15. A trim component as set forth in claim 14 wherein said plate includes a plurality of apertures disposed spaced relative to each other along the length of said plate.

16. A trim component as set forth in claim 14 wherein said plate includes a pair of edges disposed along the side of said plate and extended along the length of said plate in said groove.

17. A trim component as set forth in claim 14 wherein said plate is molded into said foam portion at said bottom of said groove.

18. A trim component as set forth in claim 14 wherein said plate is made of metal.

19. A trim component for mounting to a structural member of an automotive vehicle presenting an edge, said trim component comprising;

a body fixedly mounted to the structural member and extending substantially along the length thereof, said body presenting a primary surface facing the interior of the vehicle and a contoured mounting surface disposed opposite the primary surface and corresponding to the shape of the structural member, said contoured mounting surface including a groove extending longitudinally along a substantial portion of said body for accommodating the edge of the structural member and a plate disposed at the bottom of said groove and adjacent the edge presented by the structural member when the trim component is mounted thereto, said plate including a plurality of apertures disposed spaced relative to each other along the length of the plate and a pair of edges extending perpendicular to said plate and extending along the length of said plate in said groove, said plate engaging the edge and bending relative thereto in response to a force acting on said body to absorb and dissipate the energy generated by the force.

* * * * *